UNITED STATES PATENT OFFICE.

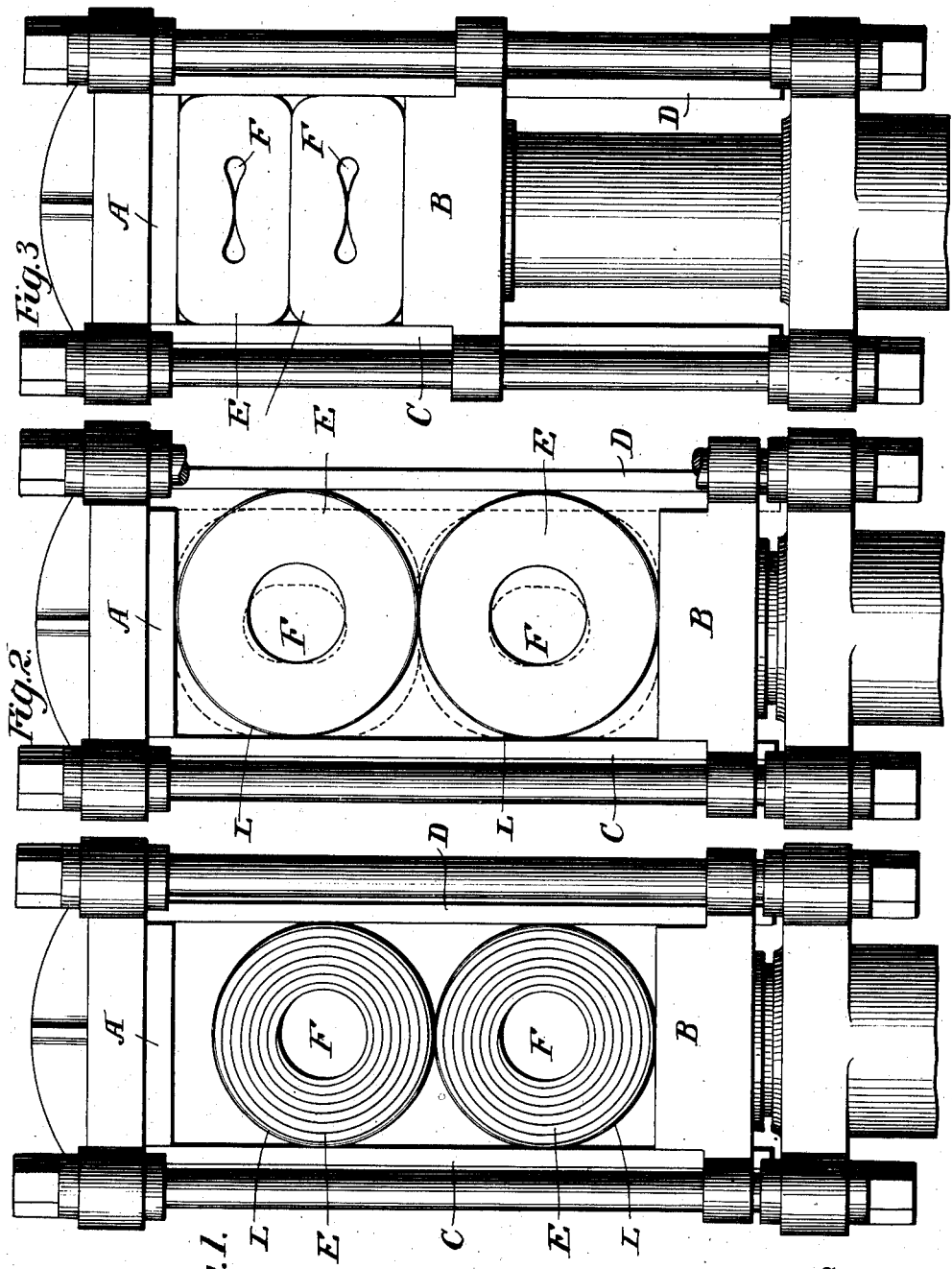

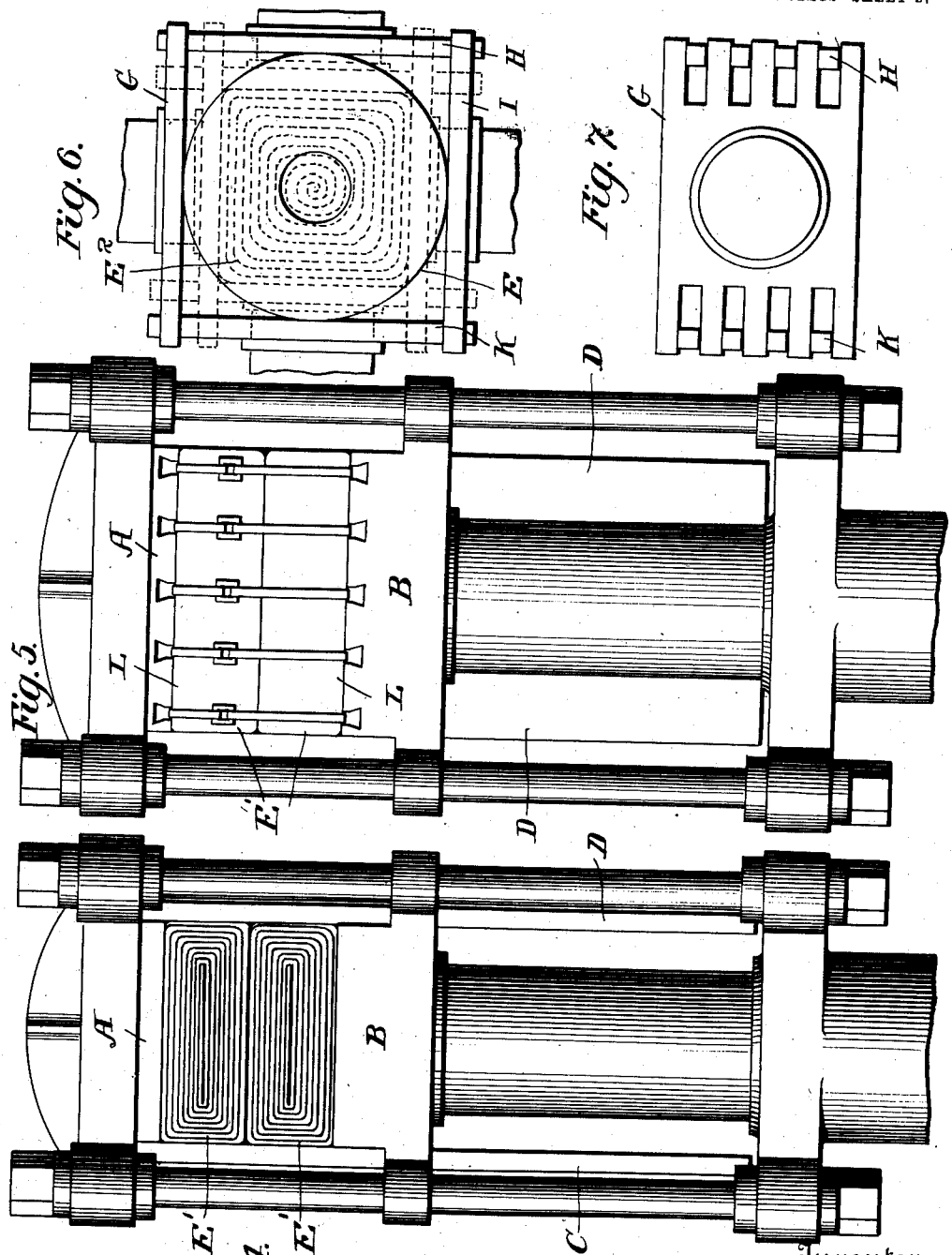

CHARLES J. LUCE, OF NIANTIC, CONNECTICUT, ASSIGNOR TO THE LUCE COMPRESS & COTTON COMPANY, OF NEW ORLEANS, LOUISIANA, A CORPORATION OF DELAWARE.

METHOD OF BALING FIBROUS MATERIAL AND BALE.

No. 864,975.          Specification of Letters Patent.          Patented Sept. 3, 1907.

Application filed April 5, 1906. Serial No. 310,126.

*To all whom it may concern:*

Be it known that I, CHARLES J. LUCE, a citizen of the United States, and a resident of Niantic, in the county of New London, Connecticut, have invented certain new and useful Improvements in Methods of Baling Fibrous Material and Bale, of which the following is a specification.

The present invention relates to a novel method of baling fibrous materials, and particularly cotton and a novel bale, which may be said to constitute a new article of manufacture.

Among the several methods of baling cotton the method of forming the material into a loose continuous sheet and then wrapping it tightly about a mandrel to form a cylindrical bale has a number of advantages, but the bales so produced also have serious disadvantages which it is the object of the present invention to obviate. The so-called round bales at present in use are received favorably by manufacturers for the reason that the web of cotton can be unwound from the bale and is thus much better adapted for use in the preparatory stages of cotton manufacture than the heterogeneous mass of cotton obtained from the square or rectangular bales. On the other hand, the round bales of cotton are objectionable for many reasons. For instance, round bales cannot be stored economically, as necessarily a large percentage of space is taken up by the interstices between the bales. This fact leads to increased freight rates in transporting the bales. Again, the interstices between round bales of cotton, and the central openings occupied by the mandrels in winding, admit air among the bales when stored and provide draft flues for the flames in case of fire, thus increasing the risk of fire and consequently the insurance rates. Other disadvantages of the present round bales are that their density increases toward the center and is so great at or near the center that they cannot be sampled satisfactorily. The great density of the bale at the center results also in rupture of the fiber unnecessarily. The round bales of cotton cannot be made of standard weight, which is a great drawback in marketing them.

By means of the present invention I am enabled to avoid all of the objectionable features of the round cotton bale, while retaining its features of value and utility.

The invention will be described in connection with the accompanying drawing, in which, Figure 1 is a diagram of a press illustrating what may be termed a second step in the improved process; Fig. 2 is a similar diagram showing a step in the process which is useful although not absolutely essential; Figs. 3 and 4 are similar diagrams illustrating the final step of forming the bale; Fig. 5 illustrates the completed bale with the ties or bands applied; Fig. 6 is a diagram illustrating the method of treating a single roll of cotton to form a rectangular bale; Fig. 7 is a side elevation of Fig. 6.

Referring to the drawing, A, B, indicate respectively the fixed and movable platens of a press, which may be of any desirable form as to detail, and C and D indicate the side members of the press for confining the material laterally.

Referring particularly to Fig. 1, E, E, indicate two cylindrical bales of cotton each formed by winding a web about a mandrel. These bales may be formed in the manner in which cylindrical or round cotton bales are now formed, with the important exception, that a large mandrel is used leaving a comparatively large central opening F, instead of the very small mandrel which is used at present in the manufacture of round cotton bales, and with the further important exception that the inner end of the web coiled about the mandrel is not wound so tightly as in the present method of baling and hence the fibers are not crushed or ruptured. The bales E thus formed are substantially "annular" in cross-section.

In carrying out my improved process I may compress a single annular bale E into a rectangular bale, as indicated in Fig. 6, or I may compress a plurality of such annular bales into a single rectangular bale, as indicated in Figs. 1 to 5 inclusive.

Referring to Figs. 1 to 5, I have shown in Fig. 1, in end view, two annular bales arranged one above the other and resting upon the movable platen B. When the platen is raised the bales collapse, the central openings closing first as indicated approximately in Fig. 3, and then closing entirely as indicated in Fig. 4. At the same time the peripheral conformation of each bale changes gradually from a circle to a rectangle, until there is, as illustrated in Fig. 4, a single bale rectangular in cross-section made up of two flat rectangular bales E', E'. This single or "duplex" bale may be then tied by any suitable fastenings, as indicated in Fig. 5. It will be understood that the individual annular bales, or the resulting "duplex" bale, may be suitably covered with burlap or other suitable material if desired. I preferably cover each of the annular bales with burlap or other suitable material L before compressing the same for the purpose of protecting the sub-bales individually when they are separated as all of the sub-bales comprising a multiple bale may not be used at the same time.

It is preferable, although not essential, to compress the annular bales laterally to a slight degree, as indicated by the dotted lines in Fig. 2, before pressing them together, as shown in Figs. 3 and 4. This may be accomplished by making one of the side walls of the press adjustable, as, for instance, the wall D. By thus first compressing the annular bales laterally, and then vertically, the corners fill out more readily and produce a more perfect rectangular bale.

In Fig. 6 I have illustrated in diagram a press for forming a rectangular bale from a single annular bale. In this figure the press is provided with four sides or platens G, H, I, K, which may be moved simultaneously toward a common center, thus compressing the single annular bale E into a solid rectangular bale $E^2$, as indicated in dotted lines.

It will be understood that the apparatus illustrated in the drawing and referred to herein is shown merely for the purpose of illustration and that the present invention can be carried out with widely different forms of baling mechanism. Bales formed by my process when stored form a solid mass without interstices and are therefore cheaper to store and transport than circular bales. At the same time the cotton web may be unwound from these rectangular bales at the factory as readily as it may be unwound from the circular bales, with the additional advantage that the fiber in my bale will be found to be intact and in good condition, while in the old round bale of cotton the fiber near the center is more or less crushed and ruptured. Furthermore my bale may be sampled at any point readily as it is substantially of uniform density throughout, whereas it is difficult to sample the old round bale near the center on account of its extreme density and hardness.

Having described my invention what I claim and desire to secure by Letters Patent is, 1. The method of baling cotton which consists in forming a bale of annular section and then compressing the same into a bale of angular section.

2. The method of baling cotton which consists in forming a bale of annular section by winding a web of cotton spirally upon itself and then compressing the said bale of annular section into a bale of angular section.

3. The method of baling cotton which consists in forming a bale of annular section and then compressing the same into a bale of rectangular section.

4. The method of baling cotton which consists in forming a bale of annular section by winding a web of cotton spirally upon itself and then compressing the said bale of annular section into a bale of rectangular section.

5. The method of baling cotton which consists in forming the cotton into a bale of annular section and then compressing the said bale in two directions to form a bale of rectangular section.

6. The method of baling cotton which consists in forming a plurality of bales of annular cross-section and then compressing said plurality of bales into a single bale of rectangular cross-section.

7. The method of baling cotton which consists in winding webs of cotton spirally to form a plurality of bales of annular cross-section and then compressing said bales together into a single solid bale of angular cross-section.

8. As a new article of manufacture, a bale of cotton of angular cross-section comprising a layer or web of cotton wound upon itself from center to periphery.

9. As a new article of manufacture, a bale of cotton of angular cross-section consisting of layers each of which is parallel with the adjacent face of the bale.

10. As a new article of manufacture, a bale of cotton of angular cross-section comprising a layer or web of cotton wound upon itself from center to periphery, each layer being parallel with the adjacent face of the bale.

In testimony whereof I affix my signature in presence of two witnesses.

CHARLES J. LUCE.

Witnesses:
A. E. T. HAUSMANN,
B. C. RUST.